United States Patent
Wiinikka et al.

(10) Patent No.: US 11,453,486 B2
(45) Date of Patent: Sep. 27, 2022

(54) ROTORCRAFT GLADE GRIP

(71) Applicant: Textron Innovations Inc., Providence, RI (US)

(72) Inventors: Mark Adam Wiinikka, Hurst, TX (US); John McCullough, Weatherford, TX (US); Russell Steven Cole, Euless, TX (US); William Russell Cleary, Jr., Mansfield, TX (US); Zachary Edwin Dailey, Grapevine, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 17/472,001

(22) Filed: Sep. 10, 2021

(65) Prior Publication Data
US 2021/0403152 A1  Dec. 30, 2021

Related U.S. Application Data

(62) Division of application No. 16/372,732, filed on Apr. 2, 2019, now Pat. No. 11,155,347.

(51) Int. Cl.
*B64C 27/48* (2006.01)
*B29C 70/54* (2006.01)
*B29L 31/08* (2006.01)

(52) U.S. Cl.
CPC ........... *B64C 27/48* (2013.01); *B29C 70/545* (2013.01); *B29L 2031/082* (2013.01)

(58) Field of Classification Search
CPC .. B64C 27/48; B29C 70/545; B29L 2031/082
See application file for complete search history.

(56) References Cited

U.S. PATENT DOCUMENTS

| | | | |
|---|---|---|---|
| 4,369,019 A | 1/1983 | Lovera et al. | |
| 4,568,245 A | 2/1986 | Hibyan et al. | |
| 5,562,416 A | 10/1996 | Schmaling et al. | |
| 8,479,581 B2 | 7/2013 | Herrig et al. | |
| 9,308,992 B2 | 4/2016 | Cabrera et al. | |
| 2002/0153450 A1* | 10/2002 | Sims | B64C 27/48 428/113 |
| 2015/0078909 A1 | 3/2015 | Wiinikka et al. | |

(Continued)

FOREIGN PATENT DOCUMENTS

| EP | 2848524 A1 | 3/2015 |
|---|---|---|
| FR | 2465643 A2 | 3/1981 |

*Primary Examiner* — Michael L Sehn
(74) *Attorney, Agent, or Firm* — Slater Matsil, LLP

(57) ABSTRACT

A rotorcraft main rotor system, including a yoke, a rotor blade, and a grip assembly attaching the rotor blade to the yoke. The grip assembly includes a grip body formed from a contiguous laminated composite and has a substantially constant thickness, where the grip body has an upper extension, a lower extension and a connecting portion connected between an inboard end of the upper extension and an inboard end of the lower extension. An inside surface of the upper extension faces, and is substantially parallel to, an inside surface of the lower extension, and the upper extension has first features and the lower extension has second features that are aligned with the first features, where the first features and second features each include at least one of an edge contour, attachment holes, or first protective elements.

20 Claims, 7 Drawing Sheets

(56) References Cited

U.S. PATENT DOCUMENTS

2016/0082696 A1  3/2016  Krasnowski et al.
2016/0311178 A1  10/2016  Cole et al.
2018/0162520 A1  6/2018  Stamps et al.
2018/0327089 A1  11/2018  Shimek et al.

* cited by examiner

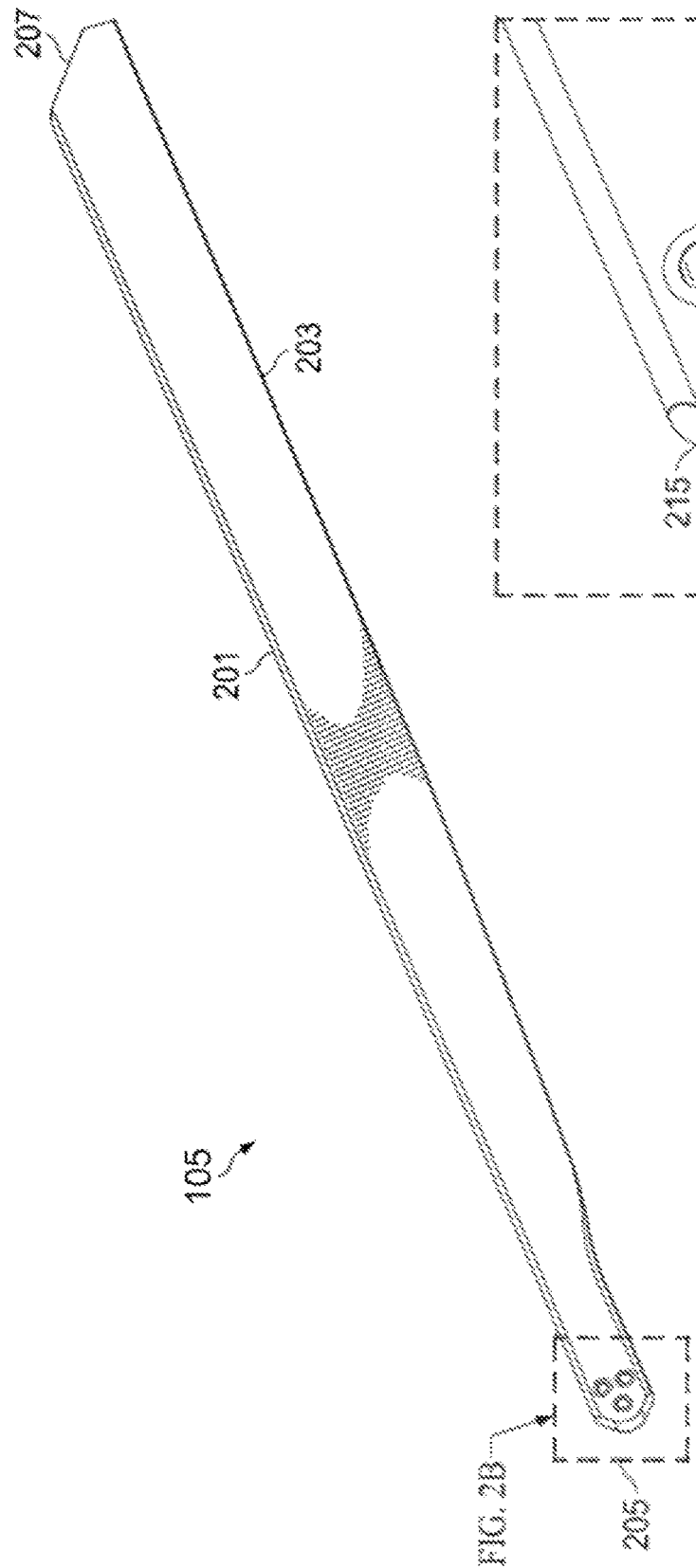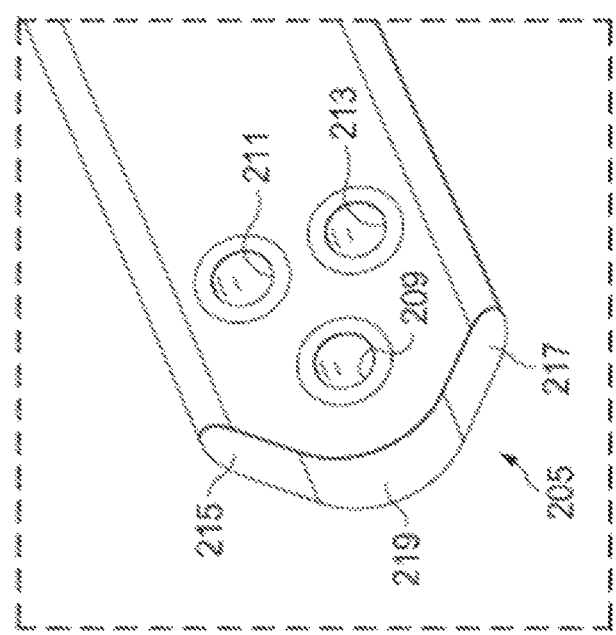

ROTORCRAFT GLADE GRIP

PRIORITY CLAIM AND CROSS-REFERENCE

This application is a divisional of U.S. patent application Ser. No. 16/372,732, filed on Apr. 2, 2019, and entitled "Rotorcraft Blade Grip," which application is incorporated herein by reference.

TECHNICAL FIELD

The present disclosure generally relates to a rotorcraft rotor assembly apparatus, and more specifically to a structural rotorcraft blade grip system and method for making the same.

BACKGROUND

Rotorcraft provide lift and thrust by rotating a set of rotor blades attached to a rotor hub that is driven by a power transmission gearbox through a rotor mast. Engines of the rotorcraft turn the rotor mast by driving a transmission connected to the rotor mast, and turn the rotor blades attached to the rotor mast. On a rotorcraft main rotor, the main rotor blades may have substantial weight and length, and, when turning at full speed, are subject to significant centrifugal force. The main rotor blades are attached by main rotor blade grips to a main rotor yoke that is attached to the rotor mast. The main rotor grips securely attach the main rotor blades to the yoke through a spherical thrust bearing which permits each of the main rotor blades to independently flap vertically, rotate on a long axis to provide cyclic and collective control of the rotorcraft, and move forward or backward within the rotor plane to lead or lag the grip attachment point.

SUMMARY

An embodiment rotorcraft main rotor system includes a yoke, a rotor blade, and a grip assembly attaching the rotor blade to the yoke. The grip assembly includes a grip body formed from a contiguous laminated composite and has a substantially constant thickness, where the grip body has an upper extension, a lower extension and a connecting portion connected between an inboard end of the upper extension and an inboard end of the lower extension. An inside surface of the upper extension faces, and is substantially parallel to, an inside surface of the lower extension, and the upper extension has first features and the lower extension has second features that are aligned with the first features, where the first features and second features each include at least one of an edge contour, attachment holes, or first protective elements.

An embodiment grip assembly, includes a grip body having an upper extension, a lower extension and a connecting portion, where the connecting portion is disposed between, and connects, an inboard end of the upper extension and an inboard end of the lower extension, where the grip body is formed from a laminated composite extending contiguously from the upper extension, through the connecting portion, to the lower extension, where the laminated composite has a plurality of layers, each layer of the plurality of layers extending contiguously along a length of the upper extension, around the connecting portion, and along a length of the lower extensions, wherein the grip body has a constant thickness along the length of the upper extension, around the connecting portion, and along the length of the lower extension, where an inside surface of the upper extension faces, and is substantially parallel to, an inside surface of the lower extension, and where an inside surface of the connecting portion has a contiguous curvature between the upper extension and lower extension.

An embodiment method includes forming a laminated structure by applying a plurality of layers of laminating material and a bonding material to a molding fixture, where each layer of the plurality of layers of laminating material, other than the outermost layers of the plurality of layers of laminating material, has a different fiber orientation than a fiber orientation of at least one immediately adjacent layer of the plurality of layers of laminating material, rolling at least one layer of the plurality of layers of laminating material, vacuum pressing the laminated structure on the molding fixture, forming a grip blank by setting the bonding material, where the grip blank includes an upper sheet, a lower sheet and a connecting blank portion, where the connecting blank portion is disposed between, and connects, the upper sheet and the lower sheet, where the grip blank comprises a laminated composite extending contiguously from the upper sheet, through the connecting blank portion, to the lower sheet, and where the grip blank has a constant thickness along a length of the upper sheet, around the connecting portion, and along a length of the lower sheet. The method further includes removing the grip blank from molding fixture, forming a reference feature in the grip blank, mounting the grip blank on a tooling fixture, and cutting a grip body from the grip blank with respect to the reference feature, where the grip body has an upper extension, a lower extension and a connecting portion, wherein the connecting portion is disposed between, and connects, an inboard end of the upper extension and an inboard end of the lower extension, and where an inside surface of the upper extension faces, and is substantially parallel to, an inside surface of the lower extension.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A illustrates a rotor blade that may be attached to the main rotor system 103 according to some embodiments;

FIG. 2B illustrates a detailed view of the root end of a rotor blade according to some embodiments;

DETAILED DESCRIPTION OF ILLUSTRATIVE EMBODIMENTS

Figure 1:
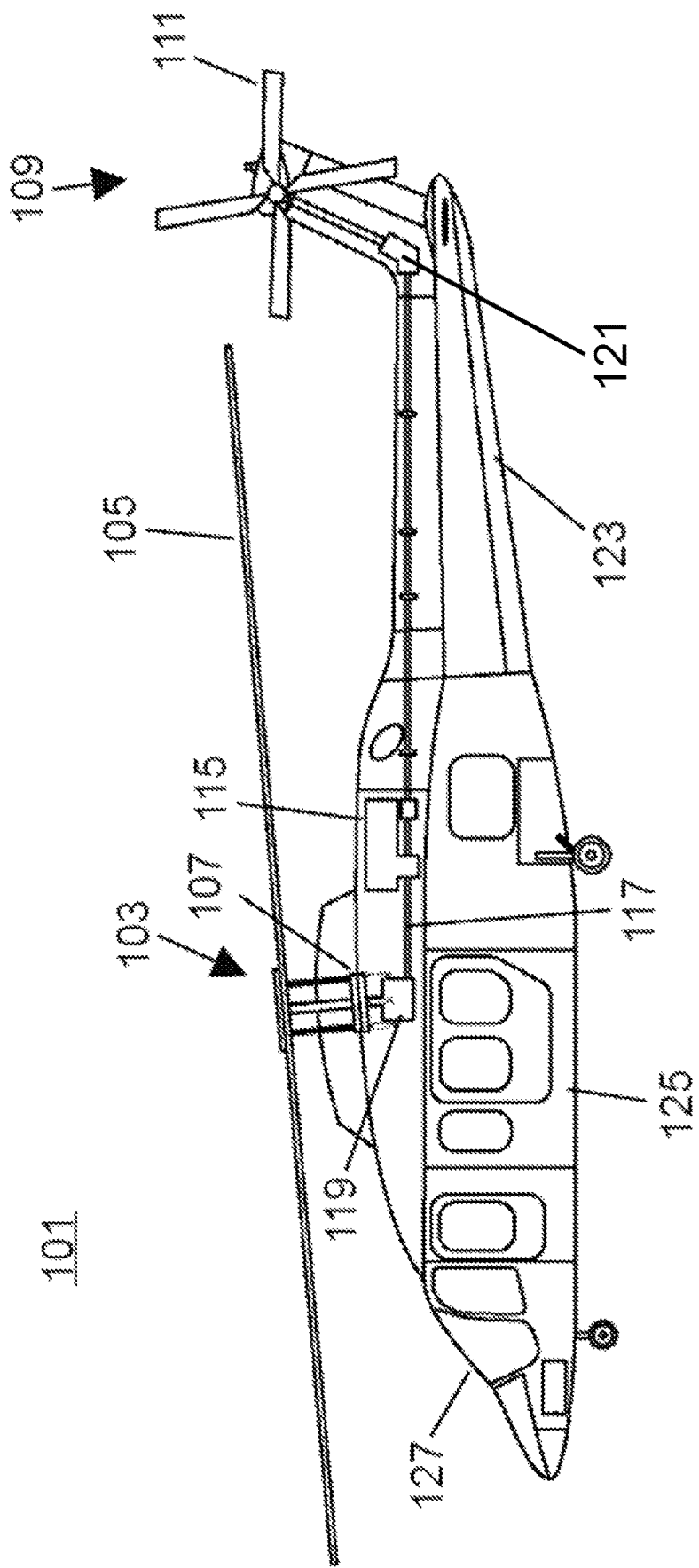
FIG. 1 illustrates a rotorcraft 101 according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

FIG. 1 illustrates a rotorcraft 101 according to some embodiments. The rotorcraft 101 has a main rotor system 103, which includes a plurality of rotor blades 105. The pitch of each rotor blade 105 may be controlled by a swashplate 107 in order to selectively control the attitude, altitude and movement of the rotorcraft 101. The swashplate 107 may be used to collectively and/or cyclically change the pitch of the rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101.

Power is supplied to the main rotor system 103 and the anti-torque system by engines 115. There may be one or more engines 115. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage includes a cockpit 127, which includes displays, controls, and instruments. It should be appreciated that even though rotorcraft 101 is depicted as having certain features, the rotorcraft may have a variety of implementation-specific configurations.

Collective pilot flight controls allow a pilot to control collective configurations, such as collective blade pitch, to rotor blades 105. Collective configurations of rotor blades 105 may change overall lift produced by rotor blades 105. For increasing or decreasing overall lift in rotor blades 105, the angle of attack for all rotor blades 105 may be collectively altered by equal amounts at the same time, resulting in ascent, descent, acceleration, or deceleration. Alteration of collective configuration of rotor blades 105 may be accomplished by input from a collective control assembly (not illustrated).

FIG. 2A illustrates a rotor blade 105 that may be attached to the main rotor system 103 according to some embodiments. The rotor blade 105 has a leading edge 201, a trailing edge 203, a root end 205, and a tip end 207. It should be appreciated that rotor blade 105 may be configured or otherwise suitably adapted to take on a variety of configurations. For example, rotor blade 105 can have a degree of built-in twist between root end 205 and tip end 207. In another embodiment, rotor blade 105 can have an anhedral tip, or any other desired aerodynamic profile.

FIG. 2B illustrates a detailed view of the root end 205 of a rotor blade 105 according to some embodiments. Mounting holes 209, 211, and 213, are disposed in the rotor blade near the root end 205 and provide openings for fasteners that may be used to attach the rotor blade 105 to a structure of the main rotor system 103. The mounting holes 209, 211 and 213 may be configured to accept fasteners such as bolts, pins, clips, screws, rivets, or the like. The mounting holes 209, 211, and 213 may, in some embodiments, include bushings, or the like, located therein as a bearing surface for the shanks of the fasteners. While three mounting holes 209, 211 and 213 are shown, other embodiments may contain more mounting holes or fewer mounting holes.

Rotor blade 105 may also include a forward taper 215 and an aft taper 217 that each taper toward a centerline axis of rotor blade 105 until joining at a rounded portion 219. Rounded portion 219 can have a radius as a function of a desired edge distance from for example, mounting hole 209.

Figure 3:
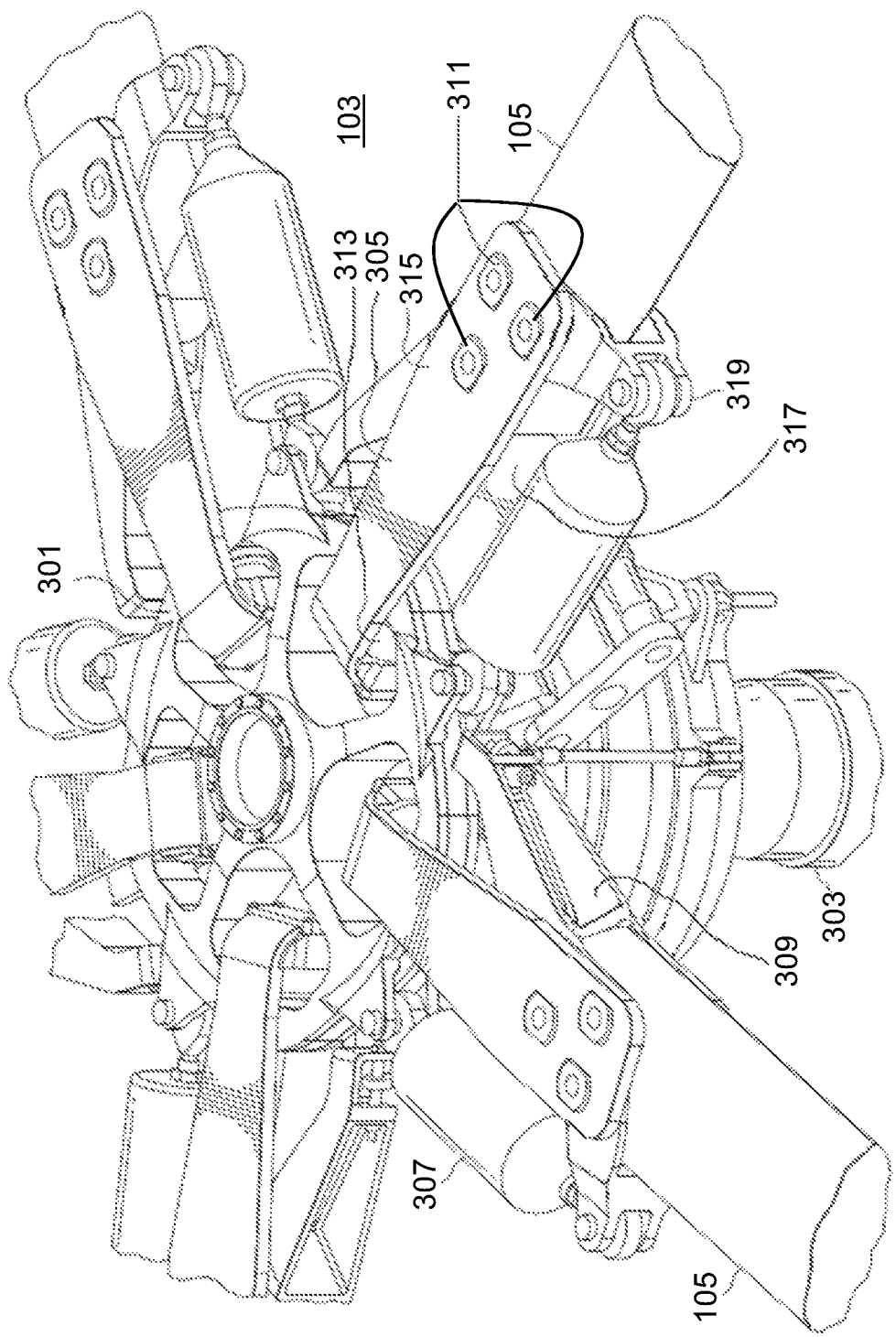
FIG. 3 illustrates a main rotor system with a grip assembly and installed rotor blade according to some embodiments.

FIG. 3 illustrates a main rotor system 103 with a grip assembly 305 and installed rotor blade 105 according to some embodiments. The main rotor system 103 includes a yoke 301 coupled to a mast 303. Each rotor blade 105 is coupled to yoke 301 by a grip assembly 305. The grip assembly 305 is U-shaped or C-shaped, with an upper extension 315 extending over a top side of the yoke 301 away from the yoke 301, and with a lower extension 317 extending below a bottom side of the yoke 301 away from the yoke 301. An inboard portion of each grip assembly 305 is secured within an opening of yoke 301 by a centrifugal force (CF) bearing 313. Each rotor blade 105 is attached to the outboard portion of grip assembly 305 by fasteners 311, such as bolts, pins, clamps, of the like. A pitch horn 309 has portions that extend between rotor blade 105, and upper extension 315 and lower extension 317 of grip assembly 305. Dampers 307 are attached between yoke 301 and a damper attachment portion 319 of the pitch horns 309.

Figure 4:
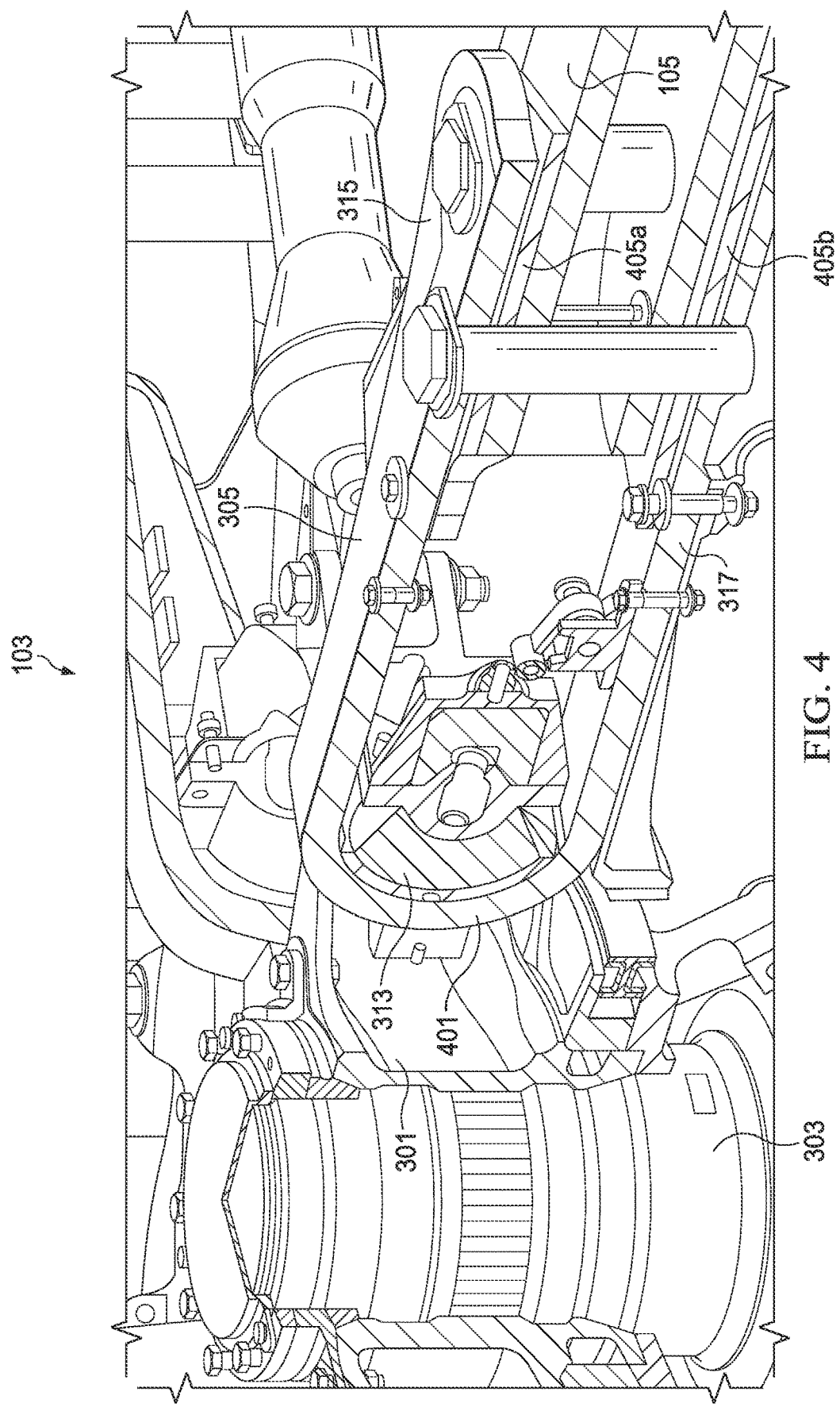
FIG. 4 is a cutaway diagram illustrating features of a main rotor system according to some embodiments.

FIG. 4 is a cutaway diagram illustrating features of main rotor system 103 according to some embodiments. The grip assembly 305 has a connecting portion 401 disposed between, and connecting, the upper extension 315 and the lower extension 317, forming a channel. In some embodiments, the upper extension 315, connecting portion 401, and lower extension 317 form a single contiguous member. The CF bearing 313 is disposed within the channel of the grip assembly 305, and may, in some embodiments, bear the grip assembly 305 and rotor blade 105 against the yoke 301. The CF bearing 313 permits the rotor blade 105 to pivot and flex with respect to the yoke 301 without requiring a complex hinge system. In some embodiments, the connecting portion 401 is contiguously curved between the upper extension 315 and the lower extension 317, with the curvature of the connecting portion facing, or curving towards, the upper extension 315 and lower extension 317. The curvature of the inside radius of the connecting portion 401 may be configured to accept the CF bearing 313, so that an outside surface of the CF bearing 313 complements, and seats against, the inside face of the connecting portion 401.

In some embodiments, the pitch horn 309 includes an upper flange 405a and lower flange 405b. The rotor blade 105 may be disposed between the upper flange 405a and the lower flange 405b. The rotor blade 105 and pitch horn 309 are disposed in the channel of the grip assembly 305 between grip assembly 305 upper extension 315 and lower extension 317, and are connected to an outboard portion of the grip assembly 305.

Figure 5:
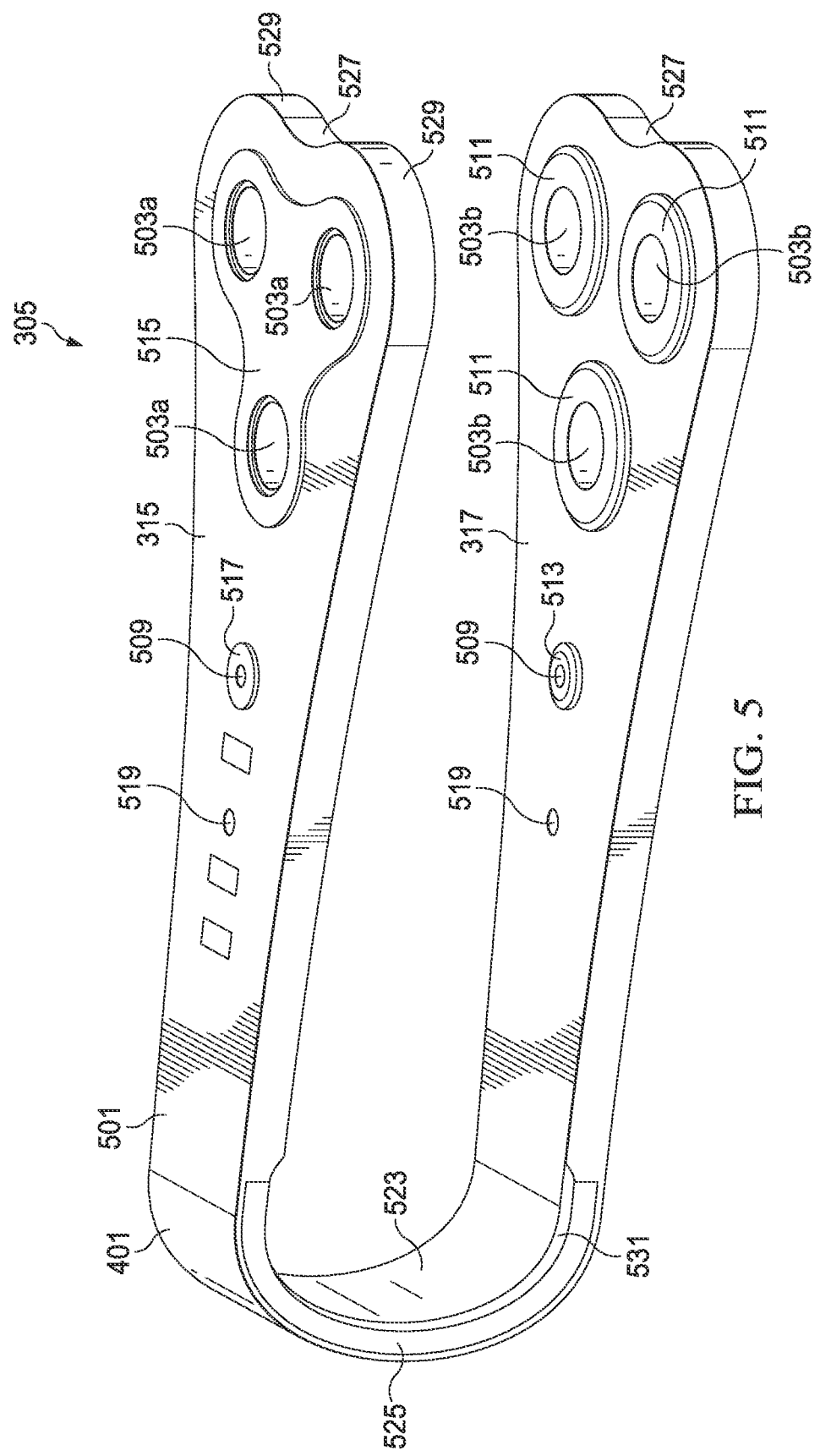
FIG. 5 illustrates a grip assembly for a rotorcraft according to some embodiments.

FIG. 5 illustrates a grip assembly 305 for a rotorcraft according to some embodiments. The grip assembly 305 has a grip body 501 comprising the upper extension 315, the lower extension 317, and the connecting portion 401. In some embodiments, the grip body 501 is formed from a contiguous laminated composite and has a substantially contact thickness through the upper extension 315, lower extension 317, and connecting portion 401. The laminated composite may have a plurality of layers, where each laminate layer of the plurality of layers is a carbon fiber tape, carbon fiber cloth, fiberglass tape or cloth, foam layer, spacer layer, or the like. In some embodiments, each laminate layer of the plurality of layers is a unidirectional carbon fiber tape, and each laminate layer of the plurality of layers may have a different orientation of fiber compared to one or both of the adjacent layers. In some embodiments, each layer of laminating material, other than the outermost layers of laminating material, has a different fiber orientation than a fiber orientation of at least one immediately adjacent layer of the plurality of layers of laminating material. Each laminate layer may be bonded by a resin material such as a thermosetting epoxy or polymer, catalyzed epoxy, ultraviolet (UV) cured epoxy, thermoplastic laminating material, or other adhesive or laminating material. Each laminate layer of the plurality of layers extends along the length of the upper extension 315, around the connecting portion 401, and along the length of the lower extension 317, and in some embodiments, the number of layers is the same in the upper extension, the connecting portion 401 and the lower extension 317, resulting the constant thickness throughout the grip body 501.

The inside surfaces of the upper extension 315 and lower extension 317 face each other, and, in some embodiments, are substantially parallel to each other. In some embodiments, the upper extension 315 and lower extension 317 have corresponding features, where the upper extension 315 has first features and the lower extension 317 have second features that correspond to the first features. Corresponding features are features that are aligned with matching or associated features on an opposing extension, and may include grip body edge contour, tooling datum holes, attachment holes, protective elements, or the like. For example, the upper extension 315 may have first attachment holes 503a and the lower extension 317 may have second attachment holes 503b that are aligned respectively with the first attachment holes 503a. Thus, pins, bolts, clips or the like that may extend through the first attachment holes 503a and through corresponding ones of the second attachment holes 503b. In another example, the edges of the upper extension 315 may be substantially aligned with the edged of the lower extension 317.

In some embodiments, the grip body 501 is wider at an outboard end than at an inboard end, with the width of the grip body 501 at the inboard end nearest the connecting portion 401 being narrower than at the outboard end to reduce the weight of the grip body 501. Additionally, in some embodiments, the grip body 501 has lobes 529 formed by the contour of the edges of the upper extension 315 and the lower extension 317. The lobes 529 in grip body 501 may correspond to, follow, or otherwise be associated with, the radius of the outer attachment holes 503a. Coves 527 are disposed on the edge of upper extension 315 between the outer first attachment holes 503a and on the edge of the lower extension 317 between the outer second attachment holes 503b. The coves 527 may reduce the weight of the grip assembly 305 by reducing the amount of material forming the grip body 501. In some embodiments, the grip body 501 may also have additional lightening features for reducing the weight of the grip body 501, such as recesses, lightening holes, or the like.

The grip assembly 305 may, in some embodiments, further have one or more protective features that protect the grip body 501 from adverse conditions such as abrasion, pressure, debris, contamination, and the like. The protective features may include bushings, bearings, protective pads, protective surfaces, coatings, shields, coverings, and the like. In some embodiments, attachment holes 503a and 503b have bushings 511, or the like, as a bearing surface or protective surface for fasteners 311, such as bolts pins, or other attachment structures used to secure the rotor blade in the grip assembly 305. The bushings 511 may be formed from bronze, aluminum, steel, titanium, nylon, fiberglass, carbon fiber, or another wear-resistant material, and may extend substantially through the respective attachment hole 503a and 503b. In some embodiments, the bushings 511 have a flange that prevents the bushings from migrating out of the attachment holes 503a and 503b. The flanges may be disposed on the inside of the grip body 501, and may have a thickness that spaces the upper extension 315 and the lower extension 317 apart from any structures that are attached between the upper extension 315 and lower extension 317. Additionally, protective pads 515 may affixed around the first attachment holes 503a and second attachment holes 503b to protect the grip body 501 from abrasion due to movement, installation or removal of fasteners. In some embodiments, the protective pads 515 are disposed on the outside face of the upper extension 315 or lower extension 317 opposite the flange of the bushings 511. In other embodiments, the protective pads 515 may be disposed on the inside faces of the upper extension 315 and lower extension 317, with the bushings arranged so that the bushing flanges are at the outside faces of the upper extension 315 and lower extension 317. In yet another embodiment, the protective pads 515 are part of the bushing 511, with the bushing having flanges at each end. In such an embodiment each bushing 511 may be a two piece structure, with different pieces of a bushing 511 being inserted from opposite ends of an attachment hole 503a and 503b.

The grip body 501 may also have one or more accessory holes in addition to the attachment holes 503a and 503b. For example, the grip body 501 may have pitch horn attachment holes 509 in the upper extension 315 and the lower extension 317. The pitch horn attachment holes 509 may have bushings 513 or the like as a bearing surface for shanks of pitch horn attachment fasteners, and the bushings 513 may have flanges that are disposed on the inside faces of the upper extension 315 and lower extension 317, and may have shanks or bodies that extend substantially through the pitch horn attachment holes 509.

A protective pad 517 may be affixed to the outside surfaces of the upper extension 315 and the lower extension 317. The protective pad 517 may be dispose around the pitch horn attachment hole 509. The grip body 501 may also have machining features or reference features such as tooling datum holes 519 in the upper extension 315 and in the lower extension 317. The tooling datum holes 519 may be reference structures used as a reference during machining of the grip body 501

In some embodiments, the protective pads 515 and 517 may be pads or structures that are bonded to the surface of the grip body 501 after the grip body 501 is molded and machined. This permits multiple grip bodies 501 to be laid up in a single blank and machined from the single blank, reducing the number of blanks needed to produce a set number of grip bodies 501. In some embodiments, the protective pads 515 and 517 are fiberglass pads that may be formed separately from the grip body 501, and then adhered or otherwise attached to surfaces of the grip body 510, and in other embodiments, the protective pads 515 and 517 may be formed in place on the grip body 501. In other embodiments, the protective pads 515 and 517 may be another sacrificial or protective material such as rubber sheet, nylon, a polytetrafluoroethylene (PTFE) material, a polyester fiber or cloth or elastomeric material, a polyoxymethylene (POM) or acetal material, high density polyethylene (HDPE) or another polymer, or a metallic material such a bronze, titanium, steel, aluminum, or the like.

In some embodiments, the protective features may also include protective surfaces 523 and 525 disposed in the surfaces and edges of the grip body 501. The protective surfaces 523 and 525 may be formed from a flexible material to permit the material to conform to the curved or contoured surface portion of the grip body. For example, the protective surfaces 523 and 525 may be formed from rubber sheet, or a polyester fiber material bonded to the grip body 515. The protective surfaces 523 and 525 may include an interior protective surface 523 disposed on the inside surface of connecting portion 401 where the CF bearing 313 mates with the connecting portion 401. Edge protective surface 525 may also be a polyester fiber material bonded to edge surface of connecting portion 401 where a CF bearing 313 clamp engages with connecting portion 401. In some embodiments, the interior protective surface 523 may be formed from a different material than the edge protective surfaces 525, for example, with the interior protective surface 523 formed from rubber sheet, and the edge protective surfaces 525 formed from polyester fiber material. Additionally, in some embodiments, the protective surfaces 523 and 525 may be another low friction or wear resistant material or coating such as fiberglass, carbon fiber, nylon, a PTFE material, a POM or acetal material, HDPE, or another polymer, or a metallic material such a bronze, titanium, steel, aluminum, or the like.

In some embodiments, the connecting member 401 may have a chamfer 531 or other feature that relieves the corner or edge of the connecting member to reduce stress on the CF bearing. In some embodiments, the interior protective surface 523 may be separate from the edge protective surface 525, and spaced apart from the edge protective surface 525 by the chamfer. In such an embodiment, the chamfer 531 may be free of the protective surfaces 523 and 525. In other embodiments, the interior protective surface 523 may be contiguous with the edge protective surface 525, extending from the interior surface of the grip body 315, over the chamfer or corner of the grip body 315 to the edge surface of the grip body 315.

Figure 6A:
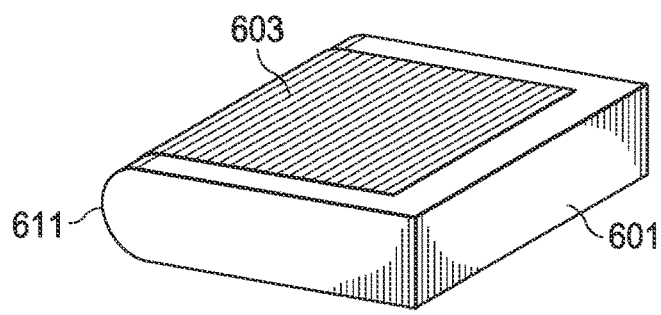
FIGS. 6a through 6e illustrate fabrication of a grip body according to some embodiments.

FIGS. 6a through 6e illustrate fabrication of a grip body according to some embodiments. FIG. 6a illustrates application of an initial layer of laminating material 603 to a molding fixture 601. The molding fixture 601 may have a finished edge 611 which, in some embodiments, is curved or otherwise contoured to provide a desired shape for the interior surface of the connecting member of a grip body.

The laminating material 603 may be carbon fiber tape, carbon fiber cloth, fiberglass, or similar laminating material. In some embodiments, the laminating material 603 may be a prepreg material, where the laminating material 603 is pre-impregnated with a bonding material. In embodiments where prepreg material is used, applying the laminating material 603 includes the application of the laminate cloth and bonding material at the same time, avoiding additional steps of applying bonding material separately. However, in other embodiments where the laminating material is non-prepreg material, a bonding material may be applied to the initial laminating material layer 603, after the laminating material 603 is set in place, and may be rolled on, or otherwise spread to impregnate the initial layer of laminating material 603 with the bonding material. In some embodiments, the bonding material, whether applied as part of the application of the prepreg laminating material, or applied separately, may be a resin material such as a thermosetting epoxy or other laminating adhesive that remains workable while additional layers of laminating material are applied. The initial layer of laminating material 603 extends from a first major surface of the molding fixture 601, around the finished edge 611, to a second major surface of the molding fixture 601 opposite the first major surface.

Figure 6B:
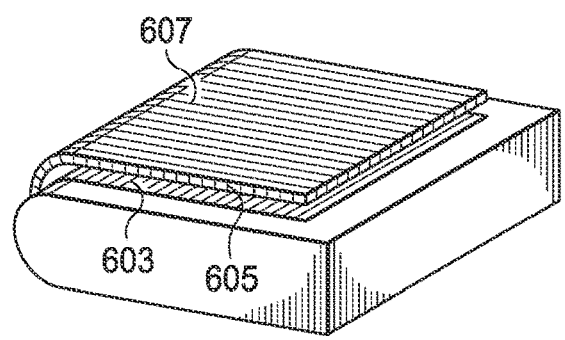

FIG. 6b illustrates application of additional layers of laminating material 605 and 607 to be laminated onto initial layer of laminating material 603. In some embodiments, laminating material layer 605 is applied on the initial layer of laminating material 603, with a fiber orientation differing from that of layer 603, and a bonding material may be applied to saturate the additional layer of laminating material 605. Another additional layer of laminating material 607 may be applied over the layer of laminating material layer 605, and additional bonding material may be applied for non-prepreg laminating material. The bonding material may be rolled, sprayed, spread, or otherwise worked into the layers of laminating material 603, 605 and 607. In some embodiments where the layers of laminating material 603, 605 and 607 are non-prepreg material, a roller is used to spread the bonding material and work the bonding material into the layers of laminating material 603, 605, and 607. In some embodiments where the layers of laminating material 603, 605 and 607 are prepreg material, the layers may be rolled or otherwise pressed to adhere the layers together and ensure a complete bond. A roller further permits an operator to press the layers of laminating material 603, 605 and 607 together, eliminating air pockets, wrinkles and other imperfections. Additionally, using a bonding material with a controllable curing cycle permits multiple layer of laminating material 603, 065 and 607 to be applied quickly without waiting for the bonding material to cure.

A grip blank for one or more grip bodies may be formed by applying additional layers of laminating material fillers such as foam or nomex layers, or the like, and by application of additional bonding material, as disclosed above. The additional layers of laminating material may be applied so that some adjacent layers of laminating material have different fiber or weave orientations to increase the strength and material stability of the finished grip bodies. In some embodiments, each additional layer of the lamination material may extend from the first major surface of the molding fixture 601, around the finished edge 611, to the second major face of the molding fixture 601 so that the resulting stack of lamination material layers has a substantially constant thickness along the length and width of the grip blank, permitting multiple grip bodies to be cut from a single grip blank. However, in other embodiments, partial layers of laminating material, reinforcement material, braces, or the like, may be included in the stack of laminating material layers to strengthen or customize specific portions of the resulting parts. Layers of laminating material may be applied until a desired thickness of lamination is achieved. In some embodiments, the stack of laminating material layers and bonding material are vacuum pressed, such as by vacuum bagging, to compress the layers of laminating material laminated on the molding fixture, and the bonding material may then be cured. In some embodiments, the bonding material is a thermosetting epoxy, and may be cured in an oven, via infrared heating, or by another heating process, while the layers of laminating material are being vacuum bagged.

Figure 6C:
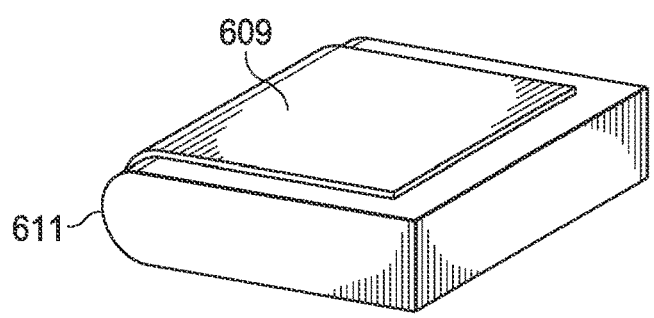

FIG. 6c illustrates grip blank 609 on the molding fixture 601 according to some embodiments. After the bonding material is cured, any vacuum bagging is removed, and the resulting structure is a grip blank 609. The grip blank 609 is then removed from the molding fixture for further processing. In some embodiments, the major faces of the molding fixture 601 may have a slight taper to facilitate removal of the grip blank 609.

Figure 6D:
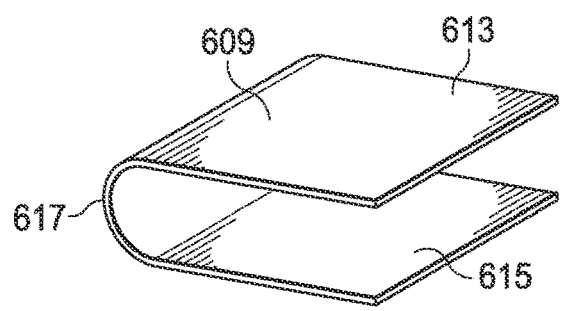

FIG. 6d shows the grip blank 609 after removal from molding fixture 601 according to some embodiments. The grip blank 609 has an upper sheet 613, a lower sheet 615, and a connecting blank portion 617 disposed between the upper sheet 613 and lower sheet 615. In some embodiments, the inside surface of the connecting blank portion 617 has a contiguous curvature between the upper sheet 613 and lower sheet 615. The radius of the inside surface of the connecting portion 617 corresponds to the outside radius of finished edge 611 of the molding fixture 601, and corresponds to an outside radius of a CF bearing of main rotor system. In other embodiments, the outside radius of molding fixture 601 finished edge 611 may correspond to a yoke portion, or other retention mechanism for a main rotor system.

In some embodiments, the grip blank 609 has the same number of laminated layers in the upper sheet 613, the lower sheet 615 and the connecting blank portion 617, and, as a result, has a substantially constant thickness along the length of the upper sheet 613, around the connecting blank portion 607, and along the length of the lower sheet 615.

Figure 6E:
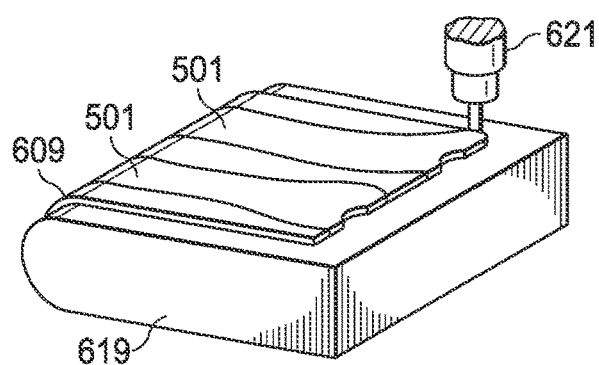

FIG. 6e illustrates machining of the grip blank 609 according to some embodiments. The grip blank 609 is mounted on a tooling fixture 619, and one or more grip bodies 501 are machined from the grip blank 609. In some embodiments, multiple grip bodies 501 are cut from the grip blank 609 using a milling machine 621, high pressure abrasive liquid or water jet system, laser cutting tool, or another cutting or milling system.

In some embodiments, the milling machine 621 may form one or more tooling datum holes that are used as reference points for subsequent milling operations. In other embodiments, tooling datum holes may be formed in the grip blank 609 prior to the grip blank 609 being mounted on the tooling fixture 619 so that the milling machine 621 moves in reference to the tooling fixture 619 and tooling datum holes.

In some embodiments, the tooling fixture 619 may be rotated or moved so that the milling machine 621 cuts separately though opposite sides of the grip clamp. In other embodiments, the milling machine 621 cuts the upper sheet 613 and lower sheet 615 at the same time, resulting in the edge features and holes of the upper sheet 613 and lower sheet 615 corresponding.

Figure 7:
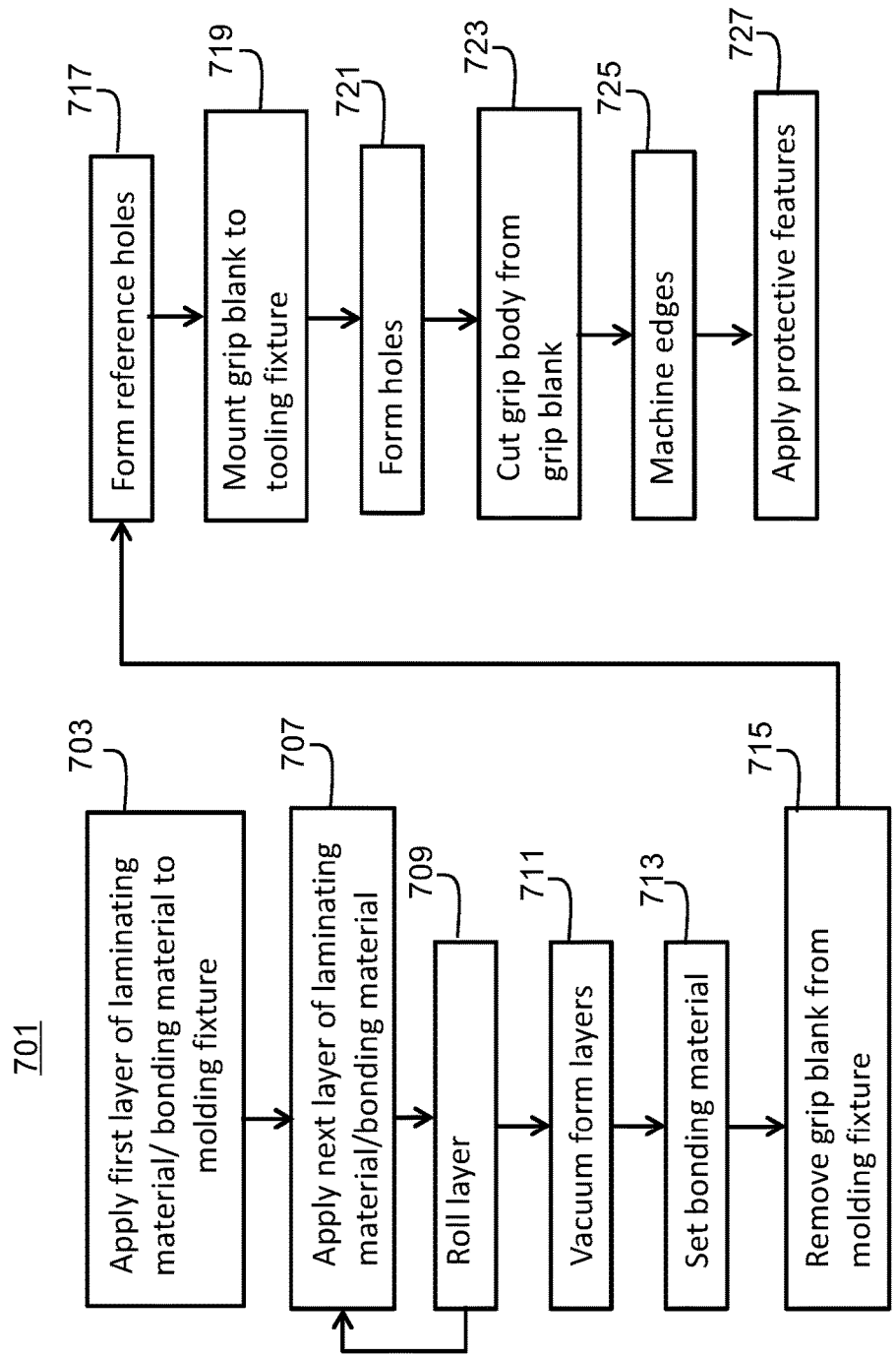
FIG. 7 is a flow chart illustrating a method for fabricating the grip assemblies according to some embodiments.

FIG. 7 is a flow chart illustrating a method 701 for fabricating the grip assemblies according to some embodiments. In block 703, a first layer of laminating material and bonding material is applied to the molding fixture. In some embodiments, the laminating material is prepreg material having a bonding material disposed in, or impregnated into, the laminating material prior to use. In other embodiments, a bonding material is applied to the initial layer of laminating material on the molding fixture, for example, where a plain or non-prepreg laminating material is used. In block 707, a next or subsequent layer of laminating material is applied over a previously applied layer of laminating material. In some embodiments where the non-prepreg laminating material is used, additional bonding material may be applied over the additional or next layer of laminating material. In block 709, the next or subsequent layer of laminating material is rolled onto the previous layers so that the bonding material causes the laminating material to bond to the previous laminating material layers. In some embodiments, each layer of laminating material is applied so that it has a different orientation of fiber compared to at least one adjacent layer. Thus, two immediately adjacent first layers of laminating material may have the same fiber orientation, but additional second layers that are immediately adjacent to the first layers may have different fiber orientations. In some embodiments, each layer of laminating material, other than the outermost layers of laminating material, has a different fiber orientation than a fiber orientation of at least one immediately adjacent layer of the plurality of layers of laminating material.

Blocks 707 through 709 are repeated until the desired thickness of lamination has been achieved. In block 711, the stack of laminating material and bonding material on the molding fixture vacuum bagged or otherwise pressed together to remove air bubbles and press the layers of laminating material together and squeeze out any excess bonding material, and assure consistent lamination. In block 713, the bonding material is cured. Setting the bonding material will depend on the bonding material used. For example, a structure using a thermoset epoxy bonding material may be cured in an oven at a specific temperature for a specific time period, while a UV cured polymer may be exposed to UV radiation to cure the bonding material. After the bonding material is set or cured, the grip blank is complete and may be removed from the molding fixture in block 715.

In block 717, one or more reference features, such as tooling datum holes, are formed in the grip blank, and may be used as machining reference points for subsequent machining. In block 719, the grip blank is mounted onto a tooling fixture. In block 721, one or more holes, such as attachment holes and the like, may be milled, cut, drilled, or otherwise formed forming attachment holes. In block 723, one or more grip bodies may be cut from the grip blank by milling or by another cutting, milling, or machining process. In block 725, additional finishing, or milling, such as machining edges may be performed. In block 727, protective features may be applied to the grip body. In some embodiments, the protective features include protective pads, bushings, protective surfaces or the like. In some embodiments, the protective pads or protective surfaces may be formed separately from the grip body and mounted or attached to surfaces edges of the grip body after formation of the respective protective feature, or may be formed in place.

While the method 701 illustrates the reference holes being formed prior to the grip blank being mounted on the tooling fixture, and the holes being formed in the grip blank prior to the grip body being cut from the blank, it should be understood that the method 701 is not limited to any particular order of steps. For example, the reference holes may be formed in the grip blank after the grip blank is mounted to the tooling fixture, the holes may be formed before the grip blank is mounted to the tooling fixture, before the references holes are formed, or after the grip body is cut from the grip blank.

An embodiment rotorcraft main rotor system includes a yoke, a rotor blade, and a grip assembly attaching the rotor blade to the yoke. The grip assembly includes a grip body formed from a contiguous laminated composite and has a substantially constant thickness, where the grip body has an upper extension, a lower extension and a connecting portion connected between an inboard end of the upper extension and an inboard end of the lower extension. An inside surface of the upper extension faces, and is substantially parallel to, an inside surface of the lower extension, and the upper extension has first features and the lower extension has second features that are aligned with the first features, where the first features and second features each include at least one of an edge contour, attachment holes, or first protective elements.

In some embodiments, the first features and the second features include attachment holes, and the grip assembly further includes bushings disposed in the attachment holes. In some embodiments, an outboard end of upper extension and an outboard end of the lower extension lower extension have each lobes corresponding to one or more of the attachment holes, and the outboard end of upper extension and the outboard end of the lower extension each have each a cove between the respective lobes. In some embodiments, the first features and the second features include the attachment holes, the first features and the second features further include the first protective elements, the first protective elements include a first protective pad affixed on an outside surface of the upper extension around the attachment holes of the upper extension, and the first protective elements further include a second protective pad affixed on an outside surface of the lower extension around the attachment holes of the lower extension. In some embodiments, the connecting portion has a second protective element, and the second protective element includes a polyester fiber material affixed to an inside surface of connecting portion and an edge surface of connecting portion. In some embodiments, the system further includes a pitch horn extending between the inside surface of the upper extension and the rotor blade and further extending between the inside surface of the lower extension and the rotor blade. In some embodiments, an inside radius of the connecting portion has a substantially contiguous curve extending from the upper extension to the lower extension.

An embodiment grip assembly, includes a grip body having an upper extension, a lower extension and a connecting portion, where the connecting portion is disposed between, and connects, an inboard end of the upper extension and an inboard end of the lower extension, where the grip body is formed from a laminated composite extending contiguously from the upper extension, through the connecting portion, to the lower extension, where the laminated composite has a plurality of layers, each layer of the plurality of layers extending contiguously along a length of the upper extension, around the connecting portion, and along a length of the lower extensions, wherein the grip body has a constant thickness along the length of the upper extension, around the connecting portion, and along the length of the lower extension, where an inside surface of the upper extension faces, and is substantially parallel to, an inside surface of the lower extension, and where an inside surface of the connecting portion has a contiguous curvature between the upper extension and lower extension.

In some embodiments, each layer of the plurality of layers has a different fiber orientation than a fiber orientation of an immediately adjacent layer of the plurality of layers. In some embodiments, the upper extension has first attachment holes and the lower extension has second attachment holes that correspond to, and are aligned with, the first attachment holes. In some embodiments, the grip body further includes bushings disposed in the first attachment holes and the second attachment holes, a first protective pad disposed on an outside surface of the upper extension around a first one of the first attachment holes, and a second protective pad disposed on an outside surface of the lower extension around a second one of the second attachment holes. In some embodiments, the first protective pad extends contiguously around additional ones of the first attachment holes, and the second protective pad extends contiguously around additional ones of the second attachment holes. In some embodiments, an outboard end of the upper extension is wider than the inboard end of the upper extension, an outboard end of the lower extension is wider than the inboard end of the lower extension, an outboard edge of the outboard end of the upper extension has first lobes corresponding to two or more of the first attachment holes and at least one first cove disposed between the first lobes, and an outboard edge of the outboard end of the lower extension has second lobes corresponding to two or more of the second attachment holes and at least one second cove disposed between the second lobes. In some embodiments, the grip assembly further includes a first polyester fiber material disposed on the inside surface of the connecting portion, and a second polyester fiber material disposed on an edge surface of the connecting portion.

An embodiment method includes forming a laminated structure by applying a plurality of layers of laminating material and a bonding material to a molding fixture, where each layer of the plurality of layers of laminating material, other than the outermost layers of the plurality of layers of laminating material, has a different fiber orientation than a fiber orientation of at least one immediately adjacent layer of the plurality of layers of laminating material, rolling at least one layer of the plurality of layers of laminating material, vacuum pressing the laminated structure on the molding fixture, forming a grip blank by setting the bonding material, where the grip blank includes an upper sheet, a lower sheet and a connecting blank portion, where the connecting blank portion is disposed between, and connects, the upper sheet and the lower sheet, where the grip blank comprises a laminated composite extending contiguously from the upper sheet, through the connecting blank portion, to the lower sheet, and where the grip blank has a constant thickness along a length of the upper sheet, around the connecting portion, and along a length of the lower sheet. The method further includes removing the grip blank from molding fixture, forming a reference feature in the grip blank, mounting the grip blank on a tooling fixture, and cutting a grip body from the grip blank with respect to the reference feature, where the grip body has an upper extension, a lower extension and a connecting portion, wherein the connecting portion is disposed between, and connects, an inboard end of the upper extension and an inboard end of the lower extension, and where an inside surface of the upper extension faces, and is substantially parallel to, an inside surface of the lower extension.

In some embodiments, forming the grip blank includes forming the grip blank with the constant thickness along the length of the upper sheet, around the connecting portion, and along a length of the lower sheet, with a constant thickness along the width of the upper sheet, and with a constant thickness along the width of the lower sheet, and wherein the cutting the grip body from the grip blank includes cutting more than one grip body from a same grip blank. In some embodiments, after cutting the grip body from the grip blank, an outboard end of the upper extension is wider than the inboard end of the upper extension, and an outboard end of the lower extension is wider than the inboard end of the lower extension. In some embodiments, cutting the grip body from the grip blank further includes forming first attachment holes in the upper extension, and forming second attachment holes in the lower extension that correspond to, and are aligned with, the first attachment holes. In some embodiments, the method further includes providing a first protective pad on an outside surface of the upper extension around the first attachment holes, providing a second protective pad on an outside surface of the lower extension around the second attachment holes, inserting first bushings into the first attachment hole and second bushings into the second attachment holes, and affixing a polyester fiber material to an inside surface of connecting portion and an edge surface of the connecting portion. In some embodiments, cutting the grip body from the grip blank further includes cutting the grip blank so that an outboard edge of an outboard end of the upper extension has first lobes corresponding to two or more of the first attachment holes and at least one first cove disposed between the first lobes, and so that an outboard edge of an outboard end of the lower extension has second lobes corresponding to two or more of the second attachment holes and at least one second cove disposed between the second lobes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
    forming a laminated structure by applying a plurality of layers of laminating material and a bonding material to a molding fixture, wherein each layer of the plurality of layers of laminating material, other than the outermost layers of the plurality of layers of laminating material, has a different fiber orientation than a fiber orientation of at least one immediately adjacent layer of the plurality of layers of laminating material;
    rolling at least one layer of the plurality of layers of laminating material;
    vacuum pressing the laminated structure on the molding fixture;
    forming a grip blank by setting the bonding material, wherein the grip blank comprises an upper sheet, a lower sheet and a connecting blank portion, wherein the connecting blank portion is disposed between, and connects, the upper sheet and the lower sheet, wherein the grip blank comprises a laminated composite extending contiguously from the upper sheet, through the connecting blank portion, to the lower sheet, and wherein the grip blank has a constant thickness along a length of the upper sheet, around the connecting portion, and along a length of the lower sheet;
    removing the grip blank from molding fixture;
    forming a reference feature in the grip blank;
    mounting the grip blank on a tooling fixture; and
    cutting a grip body from the grip blank with respect to the reference feature, wherein the grip body has an upper extension, a lower extension and a connecting portion, wherein the connecting portion is disposed between, and connects, an inboard end of the upper extension and an inboard end of the lower extension, and wherein an inside surface of the upper extension faces, and is substantially parallel to, an inside surface of the lower extension.

2. The method of claim 1, wherein forming the grip blank comprises forming the grip blank with the constant thickness along the length of the upper sheet, around the connecting portion, and along a length of the lower sheet, with a constant thickness along the width of the upper sheet, and with a constant thickness along the width of the lower sheet; and wherein the cutting of the grip body from the grip blank comprises cutting more than one grip body from the same grip blank.

3. The method of claim 1, wherein, after cutting the grip body from the grip blank, an outboard end of the upper extension is wider than the inboard end of the upper extension, and an outboard end of the lower extension is wider than the inboard end of the lower extension.

4. The method of claim 1, wherein cutting the grip body from the grip blank further comprises:
forming first attachment holes in the upper extension; and
forming second attachment holes in the lower extension that correspond to, and are aligned with, the first attachment holes.

5. The method of claim 4, further comprising:
providing a first protective pad on an outside surface of the upper extension around the first attachment holes;
providing a second protective pad on an outside surface of the lower extension around the second attachment holes;
inserting first bushings into the first attachment hole and second bushings into the second attachment holes; and
affixing a polyester fiber material to an inside surface of connecting portion and an edge surface of the connecting portion.

6. The method of claim 4, wherein cutting the grip body from the grip blank further comprises:
cutting the grip blank so that an outboard edge of an outboard end of the upper extension has first lobes corresponding to two or more of the first attachment holes and at least one first cove disposed between the first lobes, and so that an outboard edge of an outboard end of the lower extension has second lobes corresponding to two or more of the second attachment holes and at least one second cove disposed between the second lobes.

7. A method comprising:
forming a grip body of a grip assembly from a contiguous laminated composite such that the grip body has a substantially constant thickness, wherein the grip body is formed with an upper extension, a lower extension and a connecting portion connected between an inboard end of the upper extension and an inboard end of the lower extension, wherein an inside surface of the upper extension faces, and is substantially parallel to, an inside surface of the lower extension, and wherein the grip body is shaped to attach a rotor blade of a rotorcraft to a yoke;
providing first features on the upper extension and second features on the lower extension, wherein the second features are aligned with the first features, and wherein the first features and second features each comprise at least one of an edge contour, attachment holes, or protective pads; and
providing protective surfaces on the connecting portion, wherein providing the protective surfaces comprises affixing a first element of the protective surfaces on an outer surface of an inward facing portion of the connecting portion, wherein second elements of the protective surfaces are spaced apart from the first element of the protective surfaces and are affixed to edge surfaces of the connecting portion.

8. The method of claim 7, wherein providing the first features and the second features comprise providing attachment holes; and
wherein the method further comprises providing bushings disposed in the attachment holes.

9. The method of claim 7, wherein forming the grip body comprises:
forming one or more lobes corresponding to one or more of the attachment holes in an edge of outboard end of the upper extension and in an edge of an outboard end of the lower extension;
forming a cove in the edge of the outboard end of the upper extension between lobes of the upper extension; and
forming a cove in the edge of the outboard end of the lower extension between lobes of the lower extension.

10. The method of claim 7, wherein providing the first features and the second features comprises providing attachment holes as the first features and the second features, and further comprises providing the protective pads as the first features and the second features;
wherein the protective pads comprise a first protective pad affixed on an outside surface of the upper extension around the attachment holes of the upper extension; and
wherein the protective pads further comprise a second protective pad affixed on an outside surface of the lower extension around the attachment holes of the lower extension.

11. The method of claim 7, wherein the protective surfaces comprise a polyester fiber material.

12. The method of claim 7, further comprising installing the grip body on the rotorcraft with a pitch horn extending between the inside surface of the upper extension and the rotor blade and further extending between the inside surface of the lower extension and the rotor blade.

13. The method of claim 7, wherein an inside radius of the connecting portion has a substantially contiguous curve extending from the upper extension to the lower extension.

14. A method, comprising:
providing a grip body having an upper extension, a lower extension and a connecting portion, wherein the connecting portion is disposed between and connects an inboard end of the upper extension and an inboard end of the lower extension, and wherein the grip body is formed from a laminated composite extending contiguously from the upper extension, through the connecting portion, to the lower extension, wherein the laminated composite has a plurality of layers, each layer of the plurality of layers extending contiguously along a length of the upper extension, around the connecting portion, and along a length of the lower extensions, wherein the grip body has a constant thickness along the length of the upper extension, around the connecting portion, and along the length of the lower extension, wherein an inside surface of the upper extension faces, and is substantially parallel to, an inside surface of the lower extension, wherein an inward facing portion of the connecting portion has a contiguous curvature between the upper extension and lower extension; and
providing protective surfaces on the connecting portion, and wherein a first element of the protective surfaces is affixed to an outer surface of the inward facing portion of the connecting portion, wherein second elements of the protective surfaces are spaced apart from the first element of the protective surfaces and are affixed to edge surfaces of the connecting portion.

15. The method of claim 14, wherein each layer of the plurality of layers has a different fiber orientation than a fiber orientation of an immediately adjacent layer of the plurality of layers.

16. The method of claim 14, further comprising:
forming first attachment holes in the upper extension; and
forming second attachment holes in the lower extension, wherein the second attachment holes correspond to, and are aligned with, the first attachment holes.

17. The method of claim 16, further comprising:
providing bushings disposed in the first attachment holes and the second attachment holes;
providing a first protective pad on an outside surface of the upper extension and around a first one of the first attachment holes; and
providing a second protective pad on an outside surface of the lower extension and around a second one of the second attachment holes.

18. The method of claim 17, wherein the first protective pad extends contiguously around additional ones of the first attachment holes; and
wherein the second protective pad extends contiguously around additional ones of the second attachment holes.

19. The method of claim 16, wherein an outboard end of the upper extension is wider than the inboard end of the upper extension, and wherein an outboard end of the lower extension is wider than the inboard end of the lower extension; and
wherein an outboard edge of the outboard end of the upper extension has first lobes corresponding to two or more of the first attachment holes and at least one first cove disposed between the first lobes, and wherein an outboard edge of the outboard end of the lower extension has second lobes corresponding to two or more of the second attachment holes and at least one second cove disposed between the second lobes.

20. The method of claim 14, further comprising:
providing a first polyester fiber material disposed on the inside surface of the connecting portion; and
providing a second polyester fiber material disposed on an edge surface of the connecting portion.

\* \* \* \* \*